Sept. 23, 1969           T. E. BOLNER           3,468,588
LOW TORQUE FLEX-SEAL BEARING FOR THRUST VECTOR
NOZZLES FOR SOLID PROPELLANT ROCKET MOTORS
Filed Dec. 18, 1967           2 Sheets-Sheet 1

Thomas E. Bolner INVENTOR.

BY

ATTORNEY

Sept. 23, 1969 T. E. BOLNER 3,468,588
LOW TORQUE FLEX-SEAL BEARING FOR THRUST VECTOR
NOZZLES FOR SOLID PROPELLANT ROCKET MOTORS
Filed Dec. 18, 1967 2 Sheets-Sheet 2

Thomas E. Bolner INVENTOR.

BY *Robt Williams*

ATTORNEY

United States Patent Office 3,468,588
Patented Sept. 23, 1969

3,468,588
LOW TORQUE FLEX-SEAL BEARING FOR THRUST VECTOR NOZZLES FOR SOLID PROPELLANT ROCKET MOTORS
Thomas E. Bolner, Fayetteville, Tenn., assignor to Thiokol Chemical Corporation, Bristol, Pa., a corporation of Delaware
Filed Dec. 18, 1967, Ser. No. 691,450
Int. Cl. F16c 33/72, 3/14
U.S. Cl. 308—36.1                                     5 Claims

ABSTRACT OF THE DISCLOSURE

A low torque flex-seal bearing for thrust vector nozzles including, a plurality of circular metal shims separated by a lubricant, with ring shaped rubber seals interposed between the metal shims, the metal shims being provided with access ports to enable the lubrication of the bearing during assembly, so that the lubricant will maintain uniform pressure between the metal shims during operational environments of the flex-seal bearing.

BACKGROUND OF THE INVENTION

Field of the invention

For several years the ability to vector a nozzle to control the thrust of a soild propellant rocket motor has been available to the rocket industry, however the friction torque that is created during the vectoring of the nozzle has been a problem the solution of which has been sought for a long time.

The present invention therefore contemplates a flex-seal bearing that is interposed between the rocket motor case and the nozzle to reduce the existing friction and thus provide a more efficient control of the nozzle.

Description of the prior art

Gimbal nozzles have been known for a number of years but a friction torque is created between the nozzle and rocket motor case that results in "over control" of the nozzles because of the static friction and dynamic friction that exists. Thus the initiating torque is high to start the vectoring of the nozzle and suddenly reduces, so that the initiating force is greater than required and thus as previously stated results in "over control" of the nozzle. While a number of various seals have been used for the nozzles at their points of connection with the rocket motor case none have been previously used that will reduce the vectoring torque as adequately as the instant invention.

SUMMARY OF THE INVENTION

This invention therefore relates to a flex-seal bearing that is interposed between a nozzle and rocket motor case to reduce the torque friction that is created when the nozzle is vectored in relation to the longitudinal axis of the rocket motor case.

The flex-seal bearing of the instant invention provides a positive pressure seal without the use of O rings and has a lubricant contained therein which maintains induced pressure in the flex-seal bearing and thus resists the internal environment of a solid propellant rocket motor.

Since the torque required to vector the nozzle is virtually unaffected by motor operation, temperatures, or pressures the friction torque created by previously known vector nozzles is reduced substantially, so that "over control" of the nozzle is also eliminated.

The flex-seal bearing when interposed between the nozzle and the rocket motor case provides an assembly that is greatly reduced in weight over previous vector nozzles, and because of its simplicity of design will reduce the cast of such nozzles to a great extent.

The reliability and advantages of the flex-seal bearing has been established by use with several sizes of solid propellant rocket motors, and while variations of the flex-seal bearing may appear, such changes will actually be made in varying the overall size of the components that are utilized to be assembled in the flex-seal bearing.

It is an object of this invention therefore to provide a flex-seal bearing having a lubricant incorporated therein to decrease the torque friction that is usually associated with vector nozzles.

It is another object of the invention to provide a simple flex-seal bearing that is light in weight and comparatively inexpensive to manufacture.

With the above and other objects and advantages that may appear as the description of the invention proceeds, it will be noted that the invention consists of the novel details of construction and arrangement of parts, that will be illustrated in the accompanying drawings in which:

DESCRIPTION OF THE PREFERRED EMBODIMENT

Figures 1, 2, 3:
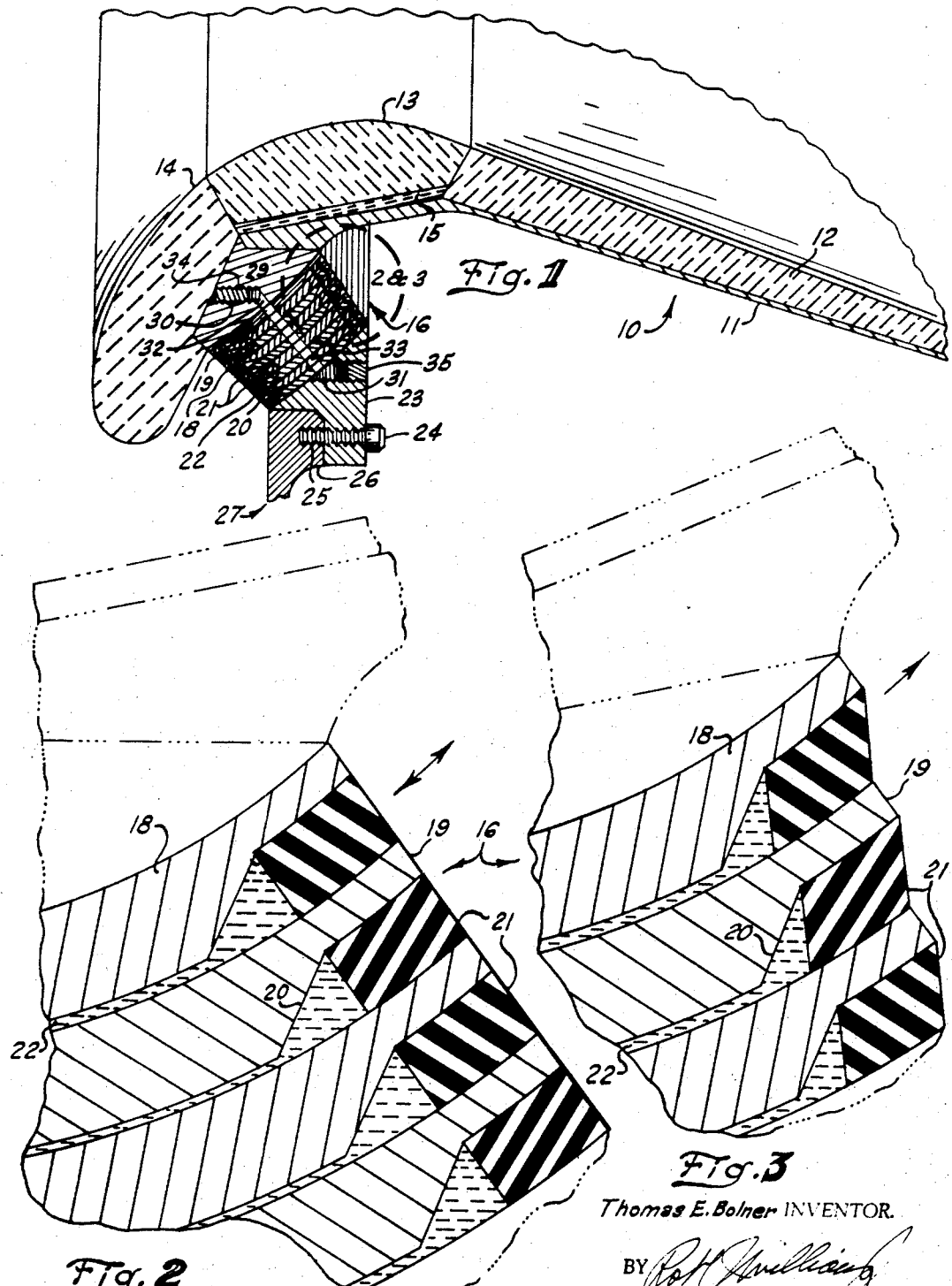
FIGURE 1 is a detailed sectional fragmentary view illustrating the manner in which a flex-seal bearing, embodying the instant invention, is mounted intermediate of a nozzle and a rocket motor case.
FIGURE 2 is a detailed enlarged fragmentary sectional view of that area encompassed by the dotted circle in FIGURE 1 and illustrating the position of the flex-seal bearing when the nozzle assumes the position shown in ful in FIGURES 4 and 5.
FIGURE 3 is a similar view to FIGURE 2 with parts removed, showing the position the flex-seal bearing will assume when the nozzle assumes the positions shown in dotted lines in FIGURES 4 and 5.
Figure 4:
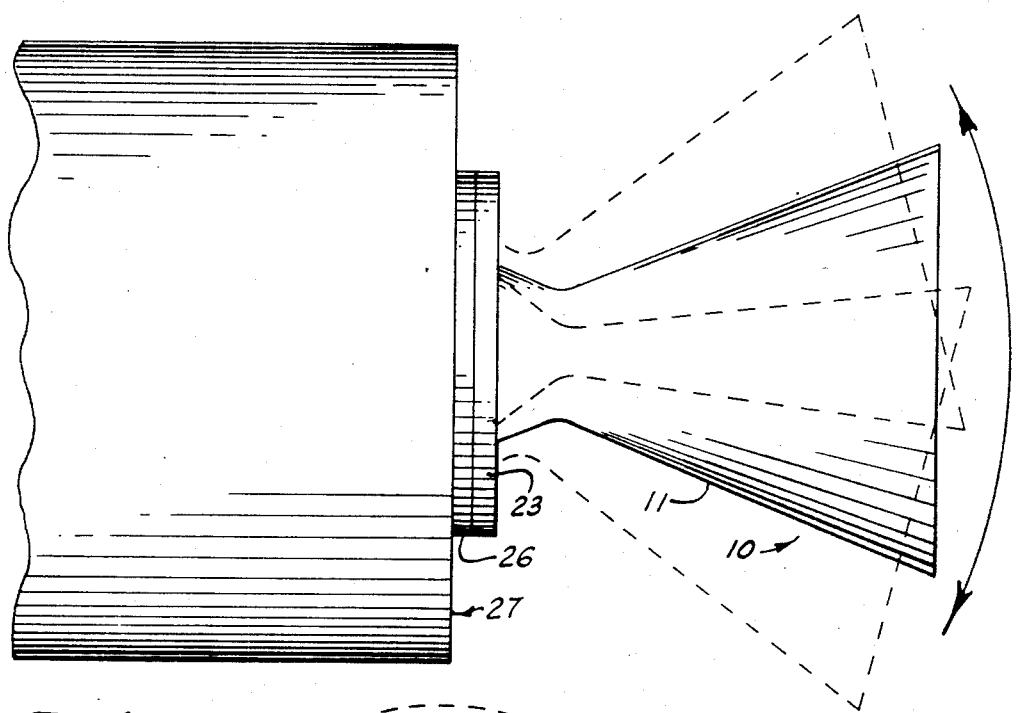
FIGURE 4 is a longitudinal view, broken away, to illustrate the various angle inclinations, a nozzle may obtain when it is connected to a rocket motor case by a flex-seal bearing embodying the instant invention.
Figure 5:
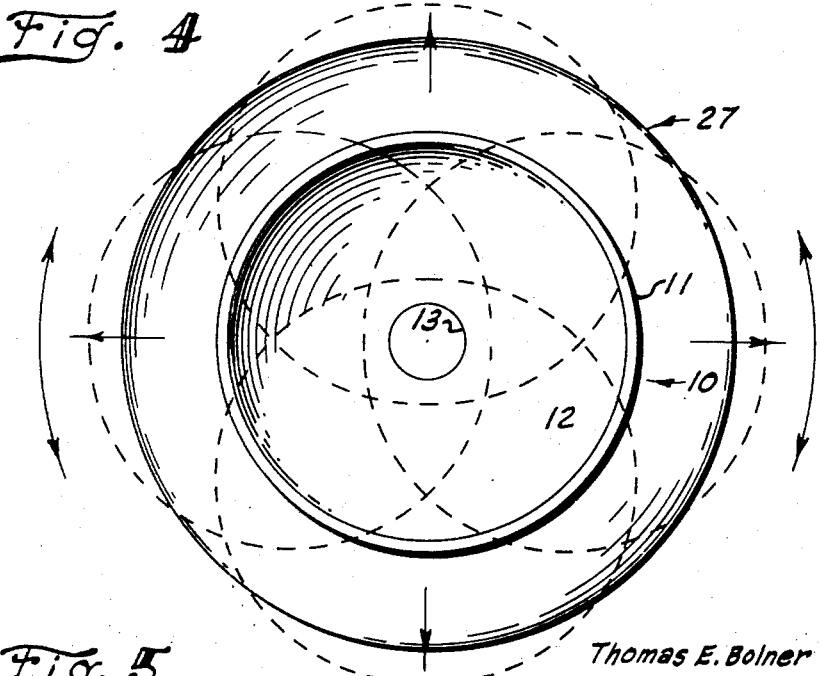
FIGURE 5 is a similar view of the aft end of a motor case more graphically illustrating the angle inclinations of the nozzle.

Referring more in detail to the drawings wherein like parts are designed by like reference numerals the reference numeral 10 is used to generally designate a conventional convergent-divergent nozzle for a solid propellant rocket motor.

The nozzle 10 as shown in FIGURE 1 comprises an outer metallic body 11, having an insulation 12 bonded to the exit cone of the body 11, a throat insert 13 in contact at its aft peripheral edge with the forward peripheral edge of the insulation 12, an insulating collar 14, in contact at its aft peripheral edge with the forward peripheral edge of the throat insert 13 and a thin layer of insulation 15, interposed between the throat insert 13, and the body 11, with all of the previously described components being rigidly bonded together into a unitary structure, such as is conventional in convergent-divergent nozzles.

The flex-seal bearing 16, embodying the invention, and as shown in FIGURE 1 comprises a plurality of metallic disc shaped shims 18. Each of the shims 18 has a reduced peripheral flange 19 which terminates at its inner edge in an inclined shoulder 20. The flange 19 provides a seat for a ring like elastomeric sealing member 21 and as shown, in FIGURES 2 and 3, the sealing members 21 are positioned intermediate of tthe shims 18. That area intermediate of each of the shims 18, that is sealed by the sealing members 21, has therein a wet or dry lubricant 22.

The outermost shim 18 at one end of the flex-seal bearing 16 is bonded to a mounting ring 23 in which is mounted a bolt 24 that enters into a threaded socket 25 in a rib flange 26 of a rocket motor case 27. At the opposite end of the flex-seal bearing 16, the outermost shim 18 is also bonded, to a positioning ring 29 which is also bonded to the collar 14, and the nozzle body 11, all as shown in FIGURE 1.

The mounting ring 23 and the positioning ring 29 are provided with threaded bores 31 and 30 respectively, and these bores communicate with a passageway 32, that extends through the shims 18, by reason of bores 33, that are positioned in the center thereof.

The bore 31 is closed by a threaded plug 35 and the bore 30 is closed by a threaded plug 34.

In assembling the flex-seal bearing 16, a plurality of shims 18 with a sealing member 21 positioned on each of the flanges 19, are positioned between the mounting ring 23 and the positioning ring 29, an evacuator is connected to the threaded bore 30 and a hydraulic pressure lubricating mechanism is connected to the bore 31.

The evacuator withdraws all air that may be trapped in the flex-seal bearing 16 and the lubricating mechanism, then injects into the passageway 32 a wet or dry lubricant 22. The lubricant 22 under pressure is thus forced into the clearance between each of the shims 18, until the shims 18 are separated by a predesigned tolerance. The evacuator is then discontinued and the plug 35 is threaded into the bore 31. The lubricating mechanism is then disconnected, and the flex-seal bearing 16, then has longitudinal compression applied thereto until the tolerance between the shims 18 is reduced to the final degree and the plug 35 is then threaded into the bore 30, and the nozzle 10 is then mounted on the flex-seal bearing 16, which is then connected to the motor case 26.

The vectoring of the nozzle 10 may be accomplished by the use of conventional mechanism such as shown in Patents 3,140,584, 2,569,497, 2,682,147, 2,801,516 and 2,746,243 but since the basic concept of the invention does not relate to such mechanism no particular vector mechanism has been shown, but several examples of such mechanism are clearly shown in the listed patents.

In assembling the flex-seal bearing 16, the width of the cross-sections thereof must be considered, the thickness of the sealing members 21 and the shims 18 must also be calculated so that the diameter of the flex-seal bearing 16 is proportioned to the torque that is to be applied thereto.

The torque being determined by the size of the nozzle and the rocket motor. The pressurized lubricant 22 between the shims 18 minimizes the friction that is created by vectoring the nozzle 10 and this reduces the torque requirements to vector the nozzle 10.

It being understood that the torque applied to the flex-seal bearing 16 is absorbed by the sealing members 21, and thus the thickness of these members is an important factor in assembling the flex-seal bearing 16.

Uniform movement of the shims 18 must also be considered so that the sealing members 21 are not deformed sufficiently to permit escape of the lubricant 22, that has been injected into the flex-seal bearing 16.

It has found to be necessary that the sealing members 21 be bonded to the shims 18 by a suitable adhesive so that the entire flex-seal bearing 16 will function as a single unit under any lateral and axial load applied hereto.

It is believed that from the foregoing description the assembly and the mode of operation will be clear to one skilled in the art and it is to be understood that any variations that may be considered in connection therewith are permissible providing such variations fall within the spirit of the invention and the scope of the appended claims.

Having thus described the invention what is claimed as new and desired to be secured by Letters Patent is:

1. A low-torque flex-seal bearing for vectoring nozzles for solid propellant rocket motors comprising a plurality of circular successive layers of metallic disc-shaped shims, a plurality of ring-like elastomeric sealing members interposed between said shims, a lubricant interposed between said shims, and mounting and positioning rings secured to the outermost shims at the opposite ends of said flex-seal bearing to retain said shims and said sealing members in assembled relation to each other.

2. A low-torque flex-seal bearing as in claim 1 wherein said mounting and positioning rings are provided with threaded bores, whereby air trapped in said flex-seal bearing is evacuated, and said lubricant is forced into said flex-seal bearing under pressure, and plugs are inserted into said threaded bores after the evacuation of said air and the injection of said lubricant.

3. A low-torque flex-seal bearing as in claim 2 wherein a centrally located passageway is provided in said shims to permit the flow of said lubricant between said shims.

4. A low-torque flex-seal bearing as in claim 1 wherein each of said shims is provided with a peripheral flange to provide a seat for receiving the sealing member that is mounted adjacent to said next positioned shim.

5. A low-torque flex-seal bearing as in claim 1 wherein an adhesive is applied to said sealing members whereby said shims and said sealing members are bonded together as a unit.

References Cited

UNITED STATES PATENTS

| | | | |
|---|---|---|---|
| 3,157,028 | 11/1964 | Gaubatz | 239—265.35 |
| 3,233,834 | 2/1966 | Cottrell | 277—27 X |
| 3,253,785 | 5/1966 | Watanabe | 239—265.15 |
| 3,373,633 | 3/1968 | Desmond | 308—36.1 X |
| 3,390,899 | 7/1968 | Herbert. | |

FOREIGN PATENTS

| | | |
|---|---|---|
| 268,034 | 3/1927 | Great Britain. |
| 621,355 | 4/1949 | Great Britain. |

MARTIN P. SCHWADRON, Primary Examiner

L. L. JOHNSON, Assistant Examiner

U.S. Cl. X.R.

60—232; 239—265.15; 277—71; 287—85; 308—240